United States Patent
Warmuth

(10) Patent No.: US 11,047,780 B2
(45) Date of Patent: Jun. 29, 2021

(54) NOISE REDUCTION FOR STRAIN-CONTROLLED TESTING

(71) Applicant: Rolls-Royce High Temperature Composites, Inc., Cypress, CA (US)

(72) Inventor: Austin Warmuth, Garden Grove, CA (US)

(73) Assignee: Rolls-Royce High Temperature Composites, Inc., Cypress, CA (US)

(*) Notice: Subject to any disclaimer, the term of this patent is extended or adjusted under 35 U.S.C. 154(b) by 218 days.

(21) Appl. No.: 16/359,855

(22) Filed: Mar. 20, 2019

(65) Prior Publication Data

US 2019/0293533 A1    Sep. 26, 2019

Related U.S. Application Data

(60) Provisional application No. 62/648,036, filed on Mar. 26, 2018.

(51) Int. Cl.
*G01N 3/00* (2006.01)
*G01N 3/08* (2006.01)
*G01N 3/02* (2006.01)

(52) U.S. Cl.
CPC .............. *G01N 3/02* (2013.01); *G01N 3/08* (2013.01); *G01N 2203/021* (2013.01)

(58) Field of Classification Search
CPC .............. G01N 3/00–24; G01N 2203/021
See application file for complete search history.

(56) References Cited

U.S. PATENT DOCUMENTS

| 7,313,971 B2 * | 1/2008 | Kawano .............. G01N 3/066 73/788 |
| 2011/0288791 A1 | 11/2011 | Jeppesen et al. |
| 2017/0219469 A1 | 8/2017 | Gu |
| 2019/0041309 A1 * | 2/2019 | Abbott ................... G01N 3/08 |

OTHER PUBLICATIONS

Hahner et al., "Validated Code-of-Practice for Strain-Controlled Thermo-Mechanical Fatigue Testing", Jun. 2006, 42 pgs.
Servopulser General Catalog, Shimadzu Servopulser—Fatigue and Endurance Testing Systems, 9 pgs., Downloaded on Jan. 17, 2018.

* cited by examiner

*Primary Examiner* — Nguyen Q. Ha
(74) *Attorney, Agent, or Firm* — Shumaker & Sieffert, P.A.

(57) ABSTRACT

A system includes a load actuator, a strain measurement device, and a computing device. The computing device is configured to receive an unconditioned displacement signal from the strain measurement device. The unconditioned displacement signal represents displacement of a specimen under load from the load actuator. The computing device is further configured to split the unconditioned displacement signal into a measurement signal and a control signal. The computing device is further configured to filter the control signal to generate a filtered control signal and control the load actuator based on the filtered control signal. The computing device is further configured to determine a strain on the specimen based on the measurement signal.

20 Claims, 3 Drawing Sheets

NOISE REDUCTION FOR STRAIN-CONTROLLED TESTING

The application claims the benefit of U.S. Provisional Application No. 62/648,036, filed Mar. 26, 2018, which is incorporated herein by reference in its entirety.

TECHNICAL FIELD

The disclosure relates to testing of materials and, in particular, strain-controlled testing of materials.

BACKGROUND

Materials used in demanding environments may be tested to determine the mechanical properties and to understand failure. To determine material properties and understand failure phenomena, such as stress relaxation or fatigue life, the material may undergo strain-controlled testing. In strain-controlled testing, strain is measured and used to control load being applied to the material. The resulting strain can be cycled to produce a waveform or held constant depending on the phenomena being investigated. Strain-controlled testing is particularly beneficial in understanding stress relaxation or when accurate application of a desired strain rates is required.

SUMMARY

In some examples, a mechanical test system includes a load actuator, a strain measurement device, and a computing device. The computing device is configured to receive an unconditioned displacement signal, such as in the form of a voltage or current change, from the strain measurement device. The unconditioned displacement signal represents the change in length of the material caused by the applied load from the load actuator. The computing device is further configured to split the unconditioned displacement signal into a measurement signal and a control signal. The computing device is further configured to filter the control signal to generate a filtered control signal and control the load actuator based on the filtered control signal. The computing device is further configured to determine the applied strain on the specimen based on the measured electrical signal.

In some examples, a method includes receiving, by a computing device, an unconditioned displacement signal from a strain measurement device. The unconditioned displacement signal represents the displacement (i.e. change in length) of a specimen under load from a load actuator. The method further includes splitting, by the computing device, the unconditioned displacement signal into a measurement signal and a control signal. The method further includes filtering, by the computing device, the control signal to generate a filtered control signal and controlling, by the computing device, the load actuator based on the filtered control signal. The method further includes determining, by the computing device, a strain on the specimen based on the measurement signal.

The details of one or more examples are set forth in the accompanying drawings and the description below. Other features, objects, and advantages of the disclosure will be apparent from the description and drawings, and from the claims.

DETAILED DESCRIPTION

Figure 1:
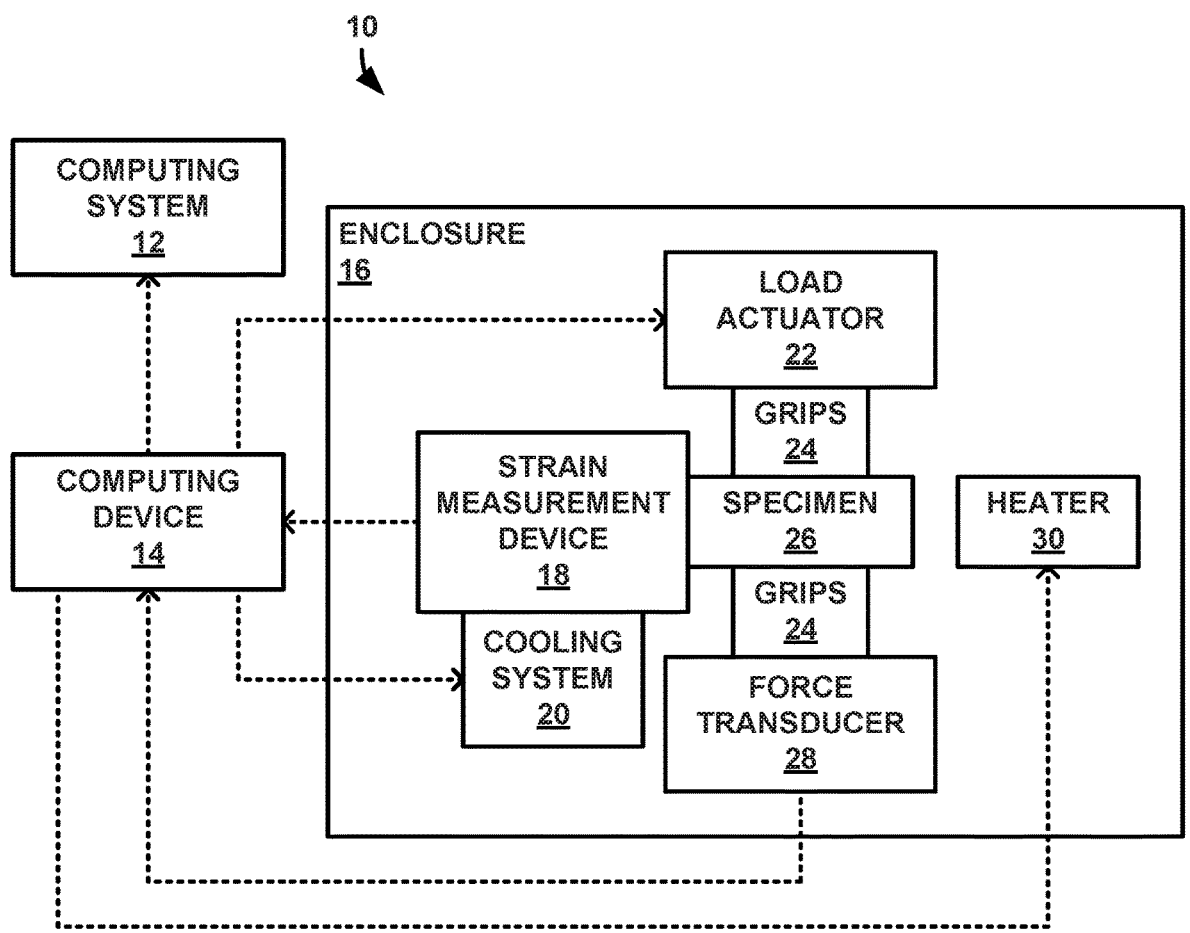
FIG. 1 is a conceptual block diagram of an example system for strain-controlled testing of a specimen.

The disclosure describes systems and techniques for reducing noise in displacement measurements and/or improving strain control during strain-controlled testing.

In strain-controlled testing, displacement measurements may be used to control the applied load and maintain the strain rate on the specimen. These displacement measurements may be subject to environmental noise, such as from vibrations and thermal expansion or contraction, and electronic noise, such as from surrounding equipment or within the power supplied to the instrumentation. Some strain-controlled testing systems may use signal conditioning techniques, such as filtering, to remove noise from the displacement measurements. However, signal conditioning techniques that are appropriate for removing noise from a displacement measurement signal may be different from signal conditioning techniques that are appropriate for generating a process control signal for controlling a load actuator. For example, a measurement signal may preferably have minimal signal conditioning to preserve displacement information, while a process control signal may preferably be filtered to reduce signal variation and increase stability of the control algorithm. The difference in signal conditioning techniques may be even greater for specimens having high stiffness, as high stiffness materials may be associated with relatively small displacement measurements that have a greater proportion of noise. For example, ceramic matrix composites (CMCs) are stiff and brittle, such that displacement measurements observed in mechanical testing and used to determine strains may be very small. As such, filtration of the displacement measurement signal to produce a suitable process control signal may filter important measurement information from the displacement measurement signal.

According to aspects of this disclosure, a strain-controlled testing system may both reduce noise in strain measurements for strain control and preserve strain measurement information in the strain measurements for determination of strain on the specimen. In one example, a system includes a computing device that splits an unconditioned displacement signal received from a strain measurement device into a measurement signal and a control signal. The computing device may filter the control signal to generate a filtered control signal and control the load actuator based on the filtered control signal. The filtered control signal may have reduced signal variation (e.g., noise) for a higher quality control signal. The computing device may determine a strain of the specimen based on the measurement signal. The measurement signal may have preserved displacement information.

Some systems described herein may include other components and techniques to reduce noise in the displacement measurements. In one example, a system includes a cooling system that removes heat from a strain measurement device to maintain the strain measurement device at a stable temperature. For example, high temperatures may cause components of the strain measurement device to expand, thus reducing accuracy of displacement measurements of the strain measurement device. However, turbulent flow of cooling fluid in a cooling system coupled to the strain measurement device may produce vibrations in strain measurement device and, as a result of the vibrations, noise in the displacement measurement generated by the strain measurement device. A computing device may be configured to control flow of the cooling fluid in the cooling system to reduce noise in the displacement measurement to reduce turbulence in the cooling system, such as by producing laminar flow of the cooling fluid at flow rates utilized by the cooling system. In some examples, the cooling system may include a low pressure flow accumulator to dampen pressure fluctuations from the coolant supply system. The cooling system may include a laminar flow nozzle, which is configured to establish a laminar flow in the cooling system. As another example, a system may include an enclosure around the strain measurement device and the specimen. The enclosure may reduce air currents impinging on the strain measurement device, thereby reducing noise in the displacement measurements.

In this way, the strain-controlled testing systems and techniques discussed herein may provide technical advantages for reducing noise and improving measurement accuracy. For example, a computing device that splits an unconditioned displacement signal into a measurement signal and a control signal may achieve a smoother applied load while maintaining high measurement accuracy, especially for materials with a high stiffness. As another example, a system that includes a cooling system configured to produce laminar cooling fluid flow and/or an enclosure may have less noise in the unconditioned displacement signal during high temperature testing.

FIG. 1 is a block diagram of an example system 10 for strain-controlled testing of a specimen 26. The example system 10 of FIG. 1 includes a computing system 12, a computing device 14, an enclosure 16, a strain measurement device 18, a cooling system 20, a load actuator 22, grips 24, a specimen 26, a force transducer 28, and a heater 30. In other examples, system 10 may include more or fewer components. For example, load actuator 22 and force transducer 28 may be included in a same unit or force transducer 28 may be omitted.

Specimen 26 may include any material to be tested using system 10. In some examples, specimen 26 is a relatively high stiffness material, such as a ceramic matrix composite (CMC). As discussed above, CMCs may have a relatively high stiffness and corresponding low amount of displacement for an applied load, such that strain measurements of CMCs may include a lower signal-to-noise ratio than strain measurements of materials that have a lower stiffness.

In the example of FIG. 1, load actuator 22, grips 24, and force transducer 28 are configured to apply a force to specimen 26. Load actuator 22 is configured to receive control signals from computing device 14 and apply a load to specimen 26 based on the control signals. For example, load actuator 22 may receive a load control signal from computing device 14 indicating a selected force and apply the selected force to grips 24. Grips 24 may be configured to secure specimen 26 and transfer a force from load actuator 22 to specimen 26 and from specimen 26 to force transducer 28. Force transducer 28 may be configured to detect a force of the applied load on specimen 26, generate force measurement signals based on the detected force, and send the force measurement signals to computing device 14. For example, force transducer 28 may detect a dynamic force from grips 24, convert the detected force into a force measurement signal, and send the force measurement signal to computing device 14. In this way, system 10 may apply a load to specimen 26.

Strain measurement device 18 is configured to measure displacement or deformation of specimen 26 under load from load actuator 22 and generate an unconditioned displacement signal based on the measured displacement of specimen 26. As load actuator 22 applies the load to specimen 26, specimen 26 may compress or extend along an axis of the applied load. The displacement of specimen 26 is related to the strain caused by the applied load on specimen 26, such as in the equation $\varepsilon_t = \ln(L/L_0)$, wherein et represents true strain, L represents displacement of specimen 26, and $L_0$ represents original length of specimen 26. Strain measurement device 18 may be configured to send the unconditioned displacement signal to computing device 14. For example, strain measurement device 18 may be configured to send the unconditioned displacement signal to computing device 14 at a selected sample rate.

Strain measurement device 18 may include any strain measurement device capable of measuring the displacement of specimen 26. Strain measurement devices that may be used include, but are not limited to: extensometers, including contact and non-contact; strain gauges; and the like. In some examples, strain measurement device 18 may be configured to measure displacement of a high stiffness material. For example, strain measurement device 18 may have a high sensitivity to strain or displacement, such that strain measurement device 18 may measure relatively small displacements for a selected load compared to displacements of lower stiffness materials under a same load.

In the example of FIG. 1, computing device 14 and heater 30 may be configured to apply and control heating to specimen 26, such as during a test of specimen 26 under different thermal conditions. Heater 30 may be configured to heat specimen 26 to a selected temperature or at a selected rate. For example, system 10 may be configured for fatigue testing of specimen 26 at high temperatures to determine stress-strain curves for a variety of temperatures experienced by specimen 26 in operating environments. Heater 30 may be communicatively coupled to computing device 14 and configured to receive control signals from computing device 14. For example, heater 30 may receive control signals from computing device 14 to heat specimen 26 to a particular temperature and heat specimen 26 to the temperature. In some examples, system 10 may include a temperature sensor, such that computing device 14, heater 30, and the temperature sensor may operate in a closed-loop to control a temperature of specimen 26 at a temperature setpoint. Heaters that may be used for heater 30 include, but are not limited to, resistive, infrared, inductance, furnace, and the like.

In the example of FIG. 1, computing device 14 and cooling system 20 may be configured to apply and control cooling to strain measurement device 18. Cooling system 20 may be thermally coupled to strain measurement device 18, such as through a heat transfer interface of a heat exchanger. Cooling system 20 may be configured to remove heat from strain measurement device 18 to maintain strain measurement device 18 at a stable temperature. For example, as explained above, system 10 may be used for fatigue testing of specimen 26 at high temperatures. High temperatures may cause components of strain measurement device 18 to expand, thus reducing accuracy of displacement measurements made by strain measurement device 18.

However, turbulent flow of a cooling fluid used to transfer heat in cooling system 20 may produce vibrations in strain measurement device 18. In some examples, the vibrations may be sufficiently large to be detected by strain measurement device 18. This may introduce noise in the unconditioned displacement signal generated by strain measurement device 18. Computing device 14 may be configured to control flow of cooling fluid in cooling system 20 to reduce noise in the unconditioned displacement signal due to turbulent flow of the cooling fluid in cooling system 20. For example, computing device 14 may control a flow rate of cooling fluid in cooling system 20 to reduce turbulence in cooling system 20, such as by controlling the cooling fluid to flow under laminar flow at flow rates utilized by cooling system 20. In some examples, computing device 14, cooling system 20, and a vibration sensor coupled to strain measurement device 18 may form a closed-loop control system to control the flow of cooling fluid to maintain vibrations detected by the vibration sensor below a setpoint that corresponds to turbulent flow.

In the example of FIG. 1, system 10 includes enclosure 16 around strain measurement device 18, specimen 26, heater 30, and/or various other components of system 10. Enclosure 16 may be configured to house at least strain measurement device 18 and specimen 26 to reduce noise in the unconditioned displacement signal due to environmental interference. For example, strain measurement device 18 may be sensitive to air currents and other interference from an environment around strain measurement device 18, e.g., due to temperature changes in the environment. This environmental interference may produce unintended deformation or displacement of specimen 26 or strain measurement device 18, which results in noise in the unconditioned displacement signal generated by strain measurement device 18. As such, system 10 may include enclosure 16 to physically block turbulent air currents, help maintain temperature control of specimen 26 and strain measurement device 18, and reduce other physical or mechanical sources of noise from around strain measurement device 18.

System 10 includes computing device 14 configured to receive measurement signals and send control signals to various components of system 10 and/or measurement signals or signals derived from the measurement signals to computing system 12. Measurement signals may include force measurement signals from force transducer 28, strain measurement signals from strain measurement device 18, temperature measurement signals from a thermocouple (not shown) in enclosure 16, vibration measurement signals from a vibration sensor (not shown) coupled to strain measurement device 18, and/or any other measurement signals of components of system 10. In the example of FIG. 1, computing device 14 is communicatively coupled to computing system 12, strain measurement device 18, cooling system 20, load actuator 22, and heater 30; however, in other examples, computing device 14 may be communicatively coupled to more or fewer components. Computing device 14 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

Computing device 14 is configured to receive the unconditioned displacement signal from strain measurement device 18. The unconditioned displacement signal may represent an unprocessed or minimally processed displacement signal for a measured displacement of specimen 26 from strain measurement device 18. For example, filtering, which may target electrical noise rejection, may be employed before the signal is passed to the computing device 14. The unconditioned displacement signal may include noise from electronic and environmental sources.

Computing device 14 is configured to split the unconditioned displacement signal into a measurement signal and a control signal. As discussed above, strain-controlled testing may utilize a displacement measurement of a specimen to both determine a strain of the specimen and control a load applied to the specimen. However, signal conditioning techniques that are appropriate for removing noise from an unconditioned displacement signal used to determine strain may be different from signal conditioning techniques that are appropriate for generating a process control signal for load control. The difference in signal conditioning techniques may be even more important for specimens having high stiffness, as high stiffness materials may be associated with displacement measurements that have a greater proportion of noise, as the displacement for a given load is less. By splitting the unconditioned displacement signal into a measurement signal and a control signal, computing device 14 may further process the measurement and control signals separately so that each signal may be better conditioned for respective measurement and control functions.

Computing device 14 is configured to filter the control signal to generate a filtered control signal and to control load actuator 22 based on the filtered control signal. For example, computing device 14 may control load actuator 22 by generating an actuator control signal based on the filtered control signal and outputting the actuator control signal to load actuator 22. To generate the actuator control signal, computing device 14 may be configured to implement process control algorithms, such as PID (proportional-integral-derivative) control algorithms. These process control algorithms may be sensitive to noise, such that computing device 14 may utilize signal conditioning techniques, including filtering, that reduce noise in the control signal to generate a filtered control signal that applies a smoother, more consistent load to specimen 26. In some examples, filtering may be selected to reject particular sources of noise. For example, computing device 14 may implement high pass filters to reject noise caused by thermal drift from heater cycling and/or low pass filters to reject electrical noise.

Computing device 14 is configured to determine a strain on specimen 26 based on the measurement signal. In some examples, computing device 14 may be configured to condition the measurement signal to remove noise from the measurement signal for a more accurate strain measurement. Computing device 14 may be configured to filter the measurement signal using different filtration techniques than filters used for the control signal discussed above. For example, computing device 14 may be configured to condition the measurement signal less aggressively than the control signal to preserve more higher frequency information in the measurement signal than in the control signal.

In some examples, computing device 14 may be configured to output the strain and/or other process variables to computing system 12. For example, computing device 14 may output a strain measurement, a temperature measurement, and a force measurement associated with an instance of a test controlled by computing device 14. Computing system 12 may be configured to receive the strain and/or other process variables and further process the strain and/or other process variables to determine information about specimen 26. For example, computing system 12 may be configured to collect strain measurements over a range of applied loads and at various temperatures to determine stress-strain curves for specimen 26 at the various temperatures.

Computing system 12 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

Computing device 12 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

Figure 2:
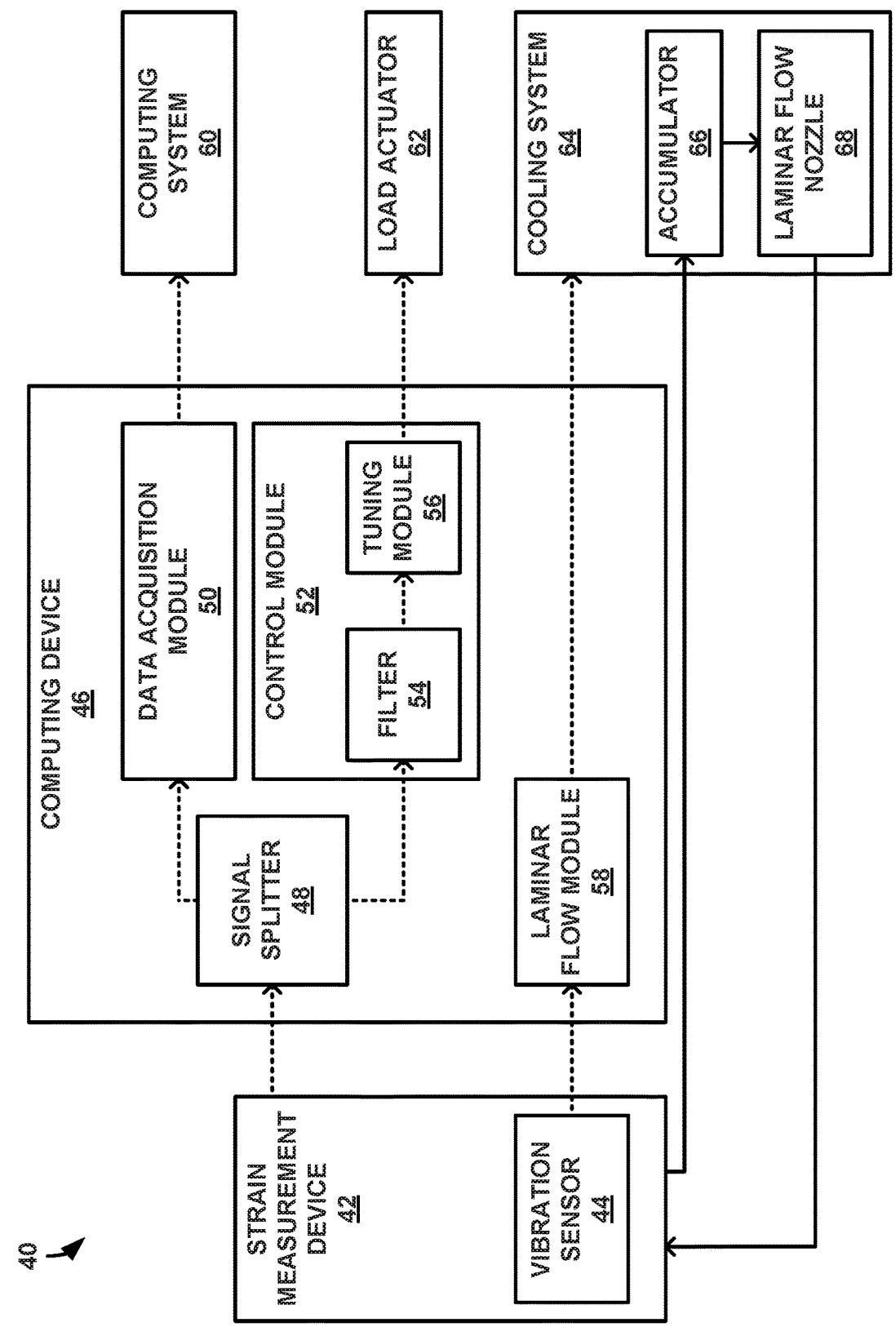
FIG. 2 is a conceptual block diagram of an example system for controlling a load actuator and generating a strain measurement during strain-controlled testing of a specimen.

FIG. 2 is an example system 40 that includes a computing device 46 for reducing noise in strain-controlled testing of a specimen. In this example, system 40 includes computing device 46, a strain measurement device 42, a computing system 60, a load actuator 62, and a cooling system 64. In the example of FIG. 2, components of system 40 may include at least the functions of equivalent components of FIG. 1. For example, computing device 46, strain measurement device 42, computing system 60, load actuator 62, and cooling system 64 may be configured to perform at least the functions described by computing device 14, strain measurement device 18, computing system 12, load actuator 22, and cooling system 20, respectively, of FIG. 1.

In the example of FIG. 2, computing device 46 includes signal splitter 48. Signal splitter 48 is configured to receive an unconditioned displacement signal from strain measurement device 42 and split the unconditioned displacement signal into a measurement signal and a control signal. Signal splitter 48 may output the measurement signal to data acquisition module 50 to be processed into a strain measurement. Signal splitter 48 may output the control signal to control module 52, such as filter 54, to be processed into an actuator control signal. In some examples, signal splitter 48 may provide preprocessing, such as amplification, to the measurement signal and the control signal.

Computing device 46 includes data acquisition module 50. Data acquisition module 50 is configured to receive the measurement signal from signal splitter 48, determine a strain on a specimen (e.g., specimen 26 of FIG. 1) based on the measurement signal, and output the strain to computing system 60. For example, data acquisition module 50 may receive a voltage or current representing the measurement signal and translate the voltage or current to a calibrated value of a mechanical strain. In some examples, data acquisition module 50 may be further configured to process the measurement signal, such as through amplification, filtering, linearization, or the like. In some examples, data acquisition module 50 may be configured to receive other data from a testing system, such as system 10 of FIG. 1, and transmit the other data to computing system 60. For example, data acquisition module 50 may include inputs from a force transducer for force measurements, a temperature detector for temperature measurements, and other components configured to generate other measurements collected during a strain-controlled fatigue test.

Computing device 46 also includes control module 52. Control module 52 is configured to receive the control signal from signal splitter 48 and output an actuator control signal to load actuator 62 to control load actuator 62. Control module 52 may include a filter 54, tuning module 56, and other process control components configured to process and/or condition the control signal. In some examples, control module 52 is configured for closed-loop operation of load actuator 62 for strain-controlled fatigue testing using a displacement or strain as a process control variable.

Filter 54 is configured to filter the control signal to generate a filtered control signal. Filters that may be used for filter 54 include, but are not limited to, low pass filters, high pass filters, band pass filters, and the like. Filter 54 may be selected based on a source of noise and may include one or more filters. For example, filter 54 may include a low pass filter configured to remove high frequency noise from the control signal, as noise generated from vibrations and temperature fluctuations and received by strain measurement device 42 may be represented in the control signal as high frequency noise. In other examples, mechanical noise, such as resonance, may be present due to stiffness of the material and/or test frame, such that filter 54 may be selected to filter out the mechanical noise. In other examples, electrical noise may be present due to poor EMF isolation or insulation of wires, such that filter 54 may be selected to filter out the electrical noise. Filter 54 may filter out the noise to produce a more accurate and/or smooth actuator control signal representing a load for load actuator 62.

Tuning module 56 is configured to generate an actuator control signal to control load actuator 22 based on the filtered control signal. For example, tuning module 56 may be configured to receive the filtered control signal and a setpoint representing a desired displacement. Tuning module 56 may be configured to convert the filtered control signal to a displacement of the specimen, compare the displacement to the setpoint, and generate an error signal. Tuning module 56 may include control algorithms, such as PID control algorithms, configured to generate the actuator control signal from the error signal. For example, tuning module 56 may be configured to tune a gain of the control algorithms to achieve a desired corrective response of load actuator 62 to reduce the magnitude of the error signal.

In the example of FIG. 2, a vibration sensor 44 is coupled to strain measurement device 42. Vibration sensor 44 may be configured to detection vibrations from strain measurement device 42 and send a vibration signal representing the vibrations to computing device 46. Vibrations to strain measurement device 18 may be caused by turbulent flow of cooling fluid to a heat exchanger (not shown) of cooling system 64 that is coupled to strain measurement device 18. While vibration sensor 44 is illustrated as coupled to strain measurement device 42, vibration sensor 44 may be coupled to other devices coupled to strain measurement device 42. Vibration sensor 44 may include a variety of vibration sensors including accelerometers and the like.

In some examples, laminar flow module 58 may perform predictive calculations to prevent cooling flow from becoming turbulent. For example, laminar flow module 58 could receive fluid properties of the cooling fluid, fluid velocity of the cooling fluid, and critical dimension(s) of cooling system 64 (i.e. cooling pipe diameter) and determine a Reynolds number based on the fluid properties, fluid velocity, and critical dimension(s). Determination of the Reynolds number may be compared with a threshold representing laminar flow, preventing turbulence from occurring in the lines of the strain measurement device.

Laminar flow module 58 is configured to receive the vibration signals from vibration sensor 44, generate a flow control signal, and output the flow control signal to cooling system 64. The flow control signal may represent a control signal to cooling system 64 that modifies a flow condition of cooling system 64 to produce laminar flow of the cooling fluid at flow rates utilized by cooling system 64. For example, laminar flow of the cooling fluid may be associated with a vibration threshold, such that laminar flow module 58 may control the flow condition so that the vibration signal from vibration sensor 44 is below the vibration threshold. Flow conditions may include flow rate of cooling fluid through cooling system 64, nozzle ejection conditions at or near strain measurement device 42, pressure cooling fluid in cooling system 64, and the like.

Cooling system 64 may be configured to circulate cooling fluid to a heat exchanger coupled to strain measurement device 42. Cooling system 64 may include components to produce laminar flow of cooling fluid through cooling system 64. In some examples, cooling system 64 may include low pressure accumulator 66. Accumulator 66 may be configured to buffer pressure variations in cooling system 64. For example, changes in temperature of cooling fluid in cooling system 64 may cause variations in pressure that may cause turbulence in the cooling fluid. By including accumulator 66, turbulence in the cooling fluid may be reduced. In some examples, cooling system 64 may include laminar flow nozzle 68, such as at an inlet to the heat exchanger coupled to strain measurement device 42. Laminar flow nozzle 68 may be configured to inject cooling fluid into the heat exchanger at laminar flow conditions. For example, an abrupt change in flow path or flow rate, such as caused by conventional inlet nozzles, may cause turbulent flow of the cooling fluid in the heat exchanger. By including laminar flow nozzle 68, turbulence in the cooling fluid may be reduced.

Figure 3:
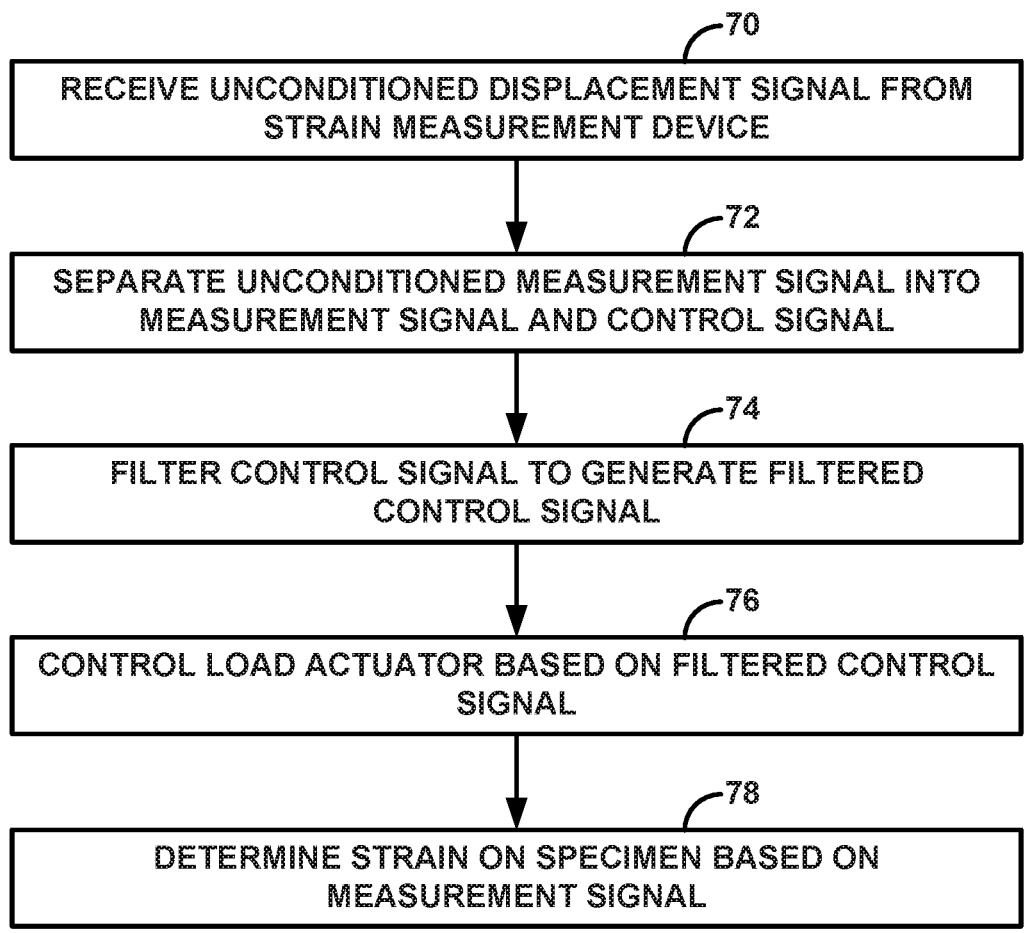
FIG. 3 is a flow diagram illustrating an example technique for controlling a load actuator and generating a strain measurement during strain-controlled testing of a specimen.

FIG. 3 is a flowchart of an example technique for strain-controlled testing. FIG. 3 will be described with reference to system 10 of FIG. 1; however, other systems, such as system 40 of FIG. 2, may be used to implement some or all of the example technique of FIG. 3. In examples in which the technique of FIG. 3 is part of a strain-controlled fatigue test, computing device 14 may receive a displacement or strain rate setpoint for computing device 14 to maintain throughout the test. For example, a test operator may enter the displacement or strain rate setpoint, such as through an input device.

In response to load actuator 22 exerting a load on specimen 26, computing device 14 receives an unconditioned displacement signal from strain measurement device 42 (70). The unconditioned displacement signal represents displacement of specimen 26 under the load from load actuator 22. Computing device 14 splits the unconditioned displacement signal into a measurement signal and a control signal (72). As discussed above, the measurement signal may be used as a measurement output of computing device 14 and the control signal may be used as a feedback output of computing device 14.

Computing device 14 filters the control signal to generate a filtered control signal (74). As discussed earlier, the unconditioned displacement signal may have a substantial amount of noise, such that the unconditioned displacement signal is not appropriate for use as a control signal. By filtering the control signal, the control signal may have less noise and, correspondingly, a more accurate control signal for control of load actuator 22. Computing device 14 controls load actuator 22 based on the filtered control signal (76). For example, computing device 14 may convert the filtered control signal to a displacement rate of the specimen, compare the displacement rate to the setpoint, generate an error signal, and generate an actuator control signal from the error signal to control load actuator 22.

Computing device 14 determines a strain on specimen 26 based on the measurement signal (78). For example, computing device 14 may convert the displacement represented by the measurement signal into a strain, such as by using measurements of specimen 26.

Computing device 14 may repeat steps 70-78 for a duration of the test. For example, computing device 14 may receive unconditioned displacement signals at a particular sample rate and output strain measurements, such as to computing system 12, for each unconditioned displacement signal. Computing device 14 may also receive force measurement signals from force transducer 28 and other measurements from components of system 10 for the duration of the test and output the measurements to computing system 12. Computing system 12 may receive the strain measurements and, optionally, other test measurements for use in determining properties of specimen 26. For example, computing system 12 may determine stress measurements from the force measurements and generate stress-strain curves for specimen 26.

In examples in which the technique of FIG. 3 is part of a strain-controlled fatigue test for various temperatures, computing device 14 may receive one or more temperature setpoints for computing device 14 to maintain through the section of the test. Computing device 14 may also receive temperature signals from a temperature sensor (not shown) during the particular test. Computing device 14 may send control signals to heater 30 based off the one or more temperature setpoints and the temperature signals to heat specimen 26 to the one or more temperature setpoints for the strain-controlled fatigue test. In some examples, the technique of FIG. 3 may be repeated for a variety of temperatures, such as with different specimens of a same composition. Computing system 12 may associate strain measurements and other test measurements with the temperature signals for use in determining temperature-related properties of specimen 26.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system, comprising:
    a load actuator;
    a strain measurement device;
    a computing device configured to:
        receive an unconditioned displacement signal from the strain measurement device, wherein the unconditioned displacement signal represents displacement of a specimen under load from the load actuator;
        split the unconditioned displacement signal into a measurement signal and a control signal;
        filter the control signal to generate a filtered control signal;
        control the load actuator based on the filtered control signal; and
        determine a strain on the specimen based on the measurement signal.

2. The system of claim 1, wherein the strain measurement device comprises an extensometer configured to:
    detect the displacement of the specimen under load; and
    output the unconditioned displacement signal based on the detected displacement.

3. The system of claim 1, further comprising a cooling system coupled to the strain measurement device, wherein the computing device is further configured to control flow of cooling fluid through the cooling system to reduce noise due to turbulent flow of the cooling fluid in the unconditioned displacement signal.

4. The system of claim 3, wherein the cooling system comprises a low-pressure accumulator and a laminar flow nozzle configured to produce laminar flow of the cooling fluid at flow rates utilized by the cooling system.

5. The system of claim 1, further comprising an enclosure configured to house the strain measurement device and the specimen to reduce noise in the unconditioned displacement signal due to environmental interference.

6. The system of claim 1, wherein the computing device is further configured to output the strain on the specimen based on the measurement signal.

7. The system of claim 1, wherein the computing device is further configured to filter the measurement signal less aggressively than the control signal.

8. The system of claim 1, wherein the computing device is further configured to filter the control signal using a low pass filter to remove high frequency noise from the control signal.

9. The system of claim 1, wherein the computing device is further configured to determine the control signal by determining an error value between the filtered control signal and a strain rate setpoint.

10. The system of claim 1, further comprising a computing system configured to:
    receive the strain on the specimen from the computing device;
    receive a force measurement signal from the computing device;
    determine a stress on the specimen based on the force measurement signal; and
    generate a stress-strain curve from the strain on the specimen and the stress on the specimen.

11. A method, comprising:
    receiving, by a computing device, an unconditioned displacement signal from a strain measurement device, wherein the unconditioned displacement signal represents displacement of a specimen under load from a load actuator;
    splitting, by the computing device, the unconditioned displacement signal into a measurement signal and a control signal;
    filtering, by the computing device, the control signal to generate a filtered control signal;
    controlling, by the computing device, the load actuator based on the filtered control signal; and
    determining, by the computing device, a strain on the specimen based on the measurement signal.

12. The method of claim 11, further comprising:
    detecting, by the strain measurement device, the displacement of the specimen under load; and
    outputting, by the strain measurement device, the unconditioned displacement signal based on the detected displacement.

13. The method of claim 11, further comprising controlling, by the computing device, flow of cooling fluid through a cooling system coupled to the strain measurement device to reduce noise due to turbulent flow of the cooling fluid in the unconditioned displacement signal.

14. The method of claim 13, wherein the cooling system comprises a low pressure accumulator and a laminar flow nozzle configured to produce laminar flow of the cooling fluid at flow rates utilized by the cooling system.

15. The method of claim 11, further comprising outputting, by the computing device, the strain on the specimen based on the measurement signal.

16. The method of claim 11, further comprising filtering, by the computing device, the measurement signal less aggressively than the control signal.

17. The method of claim 11, wherein the control signal is filtered using a low pass filter to remove high frequency noise from the control signal.

18. The method of claim 11, wherein controlling the load actuator determining determine the control signal by determining an error value between the filtered control signal and a strain rate setpoint.

19. The method of claim 11, further comprising:
    receiving, by a computing system, the strain on the specimen from the computing device; receive a force measurement signal from the computing device;
    determining, by the computing system, a stress on the specimen based on the force measurement signal; and generating, by the computing system, a stress-strain curve from the strain on the specimen and the stress on the specimen.

20. A non-transitory computer-readable storage medium comprising instructions that, when executed, cause at least one processor of a computing device to:
receive an unconditioned displacement signal from a strain measurement device, wherein the unconditioned displacement signal represents displacement of a specimen under load from a load actuator;
split the unconditioned displacement signal into a measurement signal and a control signal;
filter the control signal to generate a filtered control signal;
control the load actuator based on the filtered control signal; and
determine a strain on the specimen based on the measurement signal.

\* \* \* \* \*